(12) United States Patent
Gu et al.

(10) Patent No.: US 11,143,804 B2
(45) Date of Patent: Oct. 12, 2021

(54) OPTIMIZATION METHODS OF POLARIZATION MODULATOR AND POLARIZATION MEASUREMENT SYSTEM

(71) Applicant: HUAZHONG UNIVERSITY OF SCIENCE AND TECHNOLOGY, Hubei (CN)

(72) Inventors: Honggang Gu, Hubei (CN); Shiyuan Liu, Hubei (CN); Xiuguo Chen, Hubei (CN); Hao Jiang, Hubei (CN); Chuanwei Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 128 days.

(21) Appl. No.: 16/162,382

(22) Filed: Oct. 16, 2018

(65) Prior Publication Data

US 2019/0361161 A1    Nov. 28, 2019

(30) Foreign Application Priority Data

May 23, 2018 (CN) .......................... 201810504060.5

(51) Int. Cl.
  *G02B 5/30* (2006.01)
  *G01N 21/17* (2006.01)
  *G02F 1/01* (2006.01)

(52) U.S. Cl.
  CPC ....... *G02B 5/3025* (2013.01); *G01N 21/1717* (2013.01); *G02F 1/0136* (2013.01)

(58) Field of Classification Search
  CPC .. G02B 5/3025; G02B 5/3083; G02B 27/286; G01J 4/04; G01J 4/00; G02F 1/0136; G02F 2001/133637; G02F 2001/133638
  See application file for complete search history.

(56) References Cited

U.S. PATENT DOCUMENTS

2015/0029507 A1    1/2015   Liu et al.

FOREIGN PATENT DOCUMENTS

CN        104914497       9/2015

OTHER PUBLICATIONS

"Search Report of Europe Counterpart Application", dated Apr. 12, 2019, pp. 1-9.

(Continued)

*Primary Examiner* — Christopher Stanford
(74) *Attorney, Agent, or Firm* — JCIPRNET

(57) ABSTRACT

The present invention belongs to the field of optical detection devices, and specifically discloses a polarization modulator and a polarization measurement system, comprising a rotating compensator and a polarizer, in which the rotating compensator is a continuously rotating composite waveplate, the composite waveplate is composed of a plurality of single-waveplates of the same material, and the overall structure of the composite waveplate is determined by thicknesses and fast axis intersection angles of the respective single-waveplates according to the optimization design of the polarization characteristic transfer matrix of the polarization modulator. The polarization modulator of the invention has the advantages of simple structure, easy processing and a wide applicable wavelength range, and a wide-waveband polarization measurement system can be designed based on the polarization modulator, which is adapted to the requirements of wide-waveband precision polarization measurement.

8 Claims, 4 Drawing Sheets

(56) References Cited

OTHER PUBLICATIONS

Matthew H. Smith, "Optimization of a dual-rotating-retarder Mueller matrix polarimeter", Applied Optics, vol. 41, No. 13, May 1, 2002, pp. 2488-2493.
Beckers, "Achromatic Linear Retarders", Applied Optics, Apr. 1971, pp. 973-975.
Pancharatnam, "Achromatic Combinations of Birefringent Plates Part II. An Achromatic Quarter-Wave Plate", Proceedings of the Indian Academy of Sciences, Apr. 1955, pp. 137-144.
Hariharan et al., "Broad-band superachromatic retarders and circular polarizers for the UV, visible and near infrared", Journal of Modern Optics, Oct. 15, 2004, pp. 2315-2322.

OPTIMIZATION METHODS OF POLARIZATION MODULATOR AND POLARIZATION MEASUREMENT SYSTEM

CROSS-REFERENCE TO RELATED APPLICATION

This application claims the priority benefit of China application serial no. 201810504060.5, filed on May 23, 2018. The entirety of the above-mentioned patent application is hereby incorporated by reference herein and made a part of this specification.

BACKGROUND OF THE INVENTION

Technical Field

The present invention belongs to the field of optical detection devices, and more particularly relates to a polarization modulator and a polarization measurement system.

Description of the Related Art

The polarization measurement system includes an ellipsometer and a polarimeter, is an important optical measuring instrument that acquires optical properties or other parameters (such as optical constants, geometric sizes and topographical distributions) of an object to be measured by detecting the polarization state or polarization state change of the polarized light after interacting (reflection or transmission) with the sample, and has a wide range of applications in physics, chemistry, material, biology, astronomy, oceanography, remote sensing, navigation and the like. The key of the polarization measurement system to achieve polarization measurement lies in modulation and demodulation of the polarized light by the polarization devices. According to the working principle of the polarization modulator, the polarization measurement system can be divided into different types. Commonly used polarization modulators include a polarizer, a liquid crystal phase retarder, a photoelastic modulator, a rotating compensator and the like. In these polarization modulation devices, the rotating compensator drives, by rotating the motor or other devices, the optical compensator to rotate continuously to realize polarization modulation and demodulation, and becomes the main polarization modulator in the current polarization measurement system, since it can realize full-polarization-state modulation and has the advantages of high modulation precision and stability, wide applicable spectral range, simple installation adjustment and calibration and the like.

Common types of rotating compensators include a waveplate and a Fresnel prism. The Fresnel prism uses the total-reflection phase transformation principle to generate a phase difference in the polarized light, so that the polarization modulation and demodulation in the ultraviolet-infrared band can be well realized. However, the Fresnel prism is complex in structure, difficult to adjust and has optical dichroism and the like. In contrast, the waveplate is usually made of a birefringent crystal material, and the phase difference is generated in the polarized light due to the birefringence characteristic of the material itself. The waveplate is compact in size, simple in structure, easy to adjust, and has no defects such as the optical dichroism and, thus, it is an ideal polarization modulator. A single-waveplate composed of a single birefringent crystal plate is the simplest waveplate, but due to the dispersion characteristic of the birefringent material, the single-waveplate has a very narrow applicable wavelength range. The usual practice is to combine several pieces of single-waveplates of the same or different materials into a compound waveplate to reduce the processing difficulty or dispersion characteristic of the single-waveplate.

Common compound waveplates include the Beckers waveplate (J M Beckers, Appl. Opt., Vol. 10, pp. 973-975, 1971) and the Pancharatnam waveplate (S. Pancharatnam, Proc. Indian. Acad. Sci. A, Vol. 41, pp. 137-144, 1955). The Beckers waveplate is a compound waveplate composed of single-waveplates of different materials, in which the partial dispersion is cancelled out through optical characteristics of the different materials. However, the achromatic characteristic of this compound waveplate depends on the selected material, and its achromatic applicable wavelength range is still limited. The Pancharatnam waveplate is an achromatic compound waveplate composed of odd-numbered (greater than or equal to 3) single-waveplates of the same material, and its achromatic characteristic is determined by the number and structure of the respective single-waveplates. However, the structure of the compound waveplate is required to be strictly symmetrical, in which the middle single-waveplate is a half-wave plate, and two other single-waveplates symmetrically disposed with respect to the middle half-wave plate are required to have the same phase retardation and fast axis azimuth. However, such a complicated structure increases the processing difficulty and greatly limits the achromatic applicable wavelength range of this compound waveplate. A super achromatic compound waveplate combines the above two kinds of achromatic compound waveplates (P. Hariharan, J. Mod. Opt., Vol. 51, pp. 2315-2322, 2004). This compound waveplate has an achromatic retardation over an ultra-wide wavelength range, but it includes at least six single-waveplates of two different materials and requires a symmetrical structure, which greatly increases the processing difficulty and cost and introduces more errors in the polarization measurement system. The above-described compound waveplates are rarely used in the actual polarization measurement system since the achromatic applicable wavelength range is limited or the structure is too complicated to process.

SUMMARY OF THE INVENTION

In view of the above-described problems, the present invention provides a polarization modulator and a polarization measurement system. The invented polarization modulator is designed as a basic polarization modulation unit to modulate and demodulate the polarization state of the polarized light, which consists of a composite waveplate rotating compensator and a polarizer, and the overall structure of the composite waveplate rotating compensator is determined according to the optimization design of the polarization characteristic transfer matrix of the polarization modulator. The designed polarization modulator has the advantages of simple structure, easy processing and wide applicable wavelength range, and a wide-waveband polarization measurement system can be designed based on the polarization modulator, which is adapted to the requirements of wide-waveband precision polarization measurement.

In order to achieve the above objective, according to an aspect of the present invention, there is provided a polarization modulator, comprising a rotating compensator and a polarizer, wherein the rotating compensator is a continuously rotating composite waveplate, the composite waveplate is composed of a plurality of single-waveplates of the same material, and the overall structure of the composite waveplate is determined by thicknesses and intersection angles between the fast axes of the respective single-waveplates according to the optimization design of the polarization characteristic transfer matrix of the polarization modulator.

Further, in the process of determining the overall structure of the composite waveplate according to the optimization design of the polarization characteristic transfer matrix, the criterion is that the singularity of the polarization characteristic transfer matrix of the polarization modulator is minimized in the applicable wavelength range of the polarization modulator.

Further, minimizing the singularity in the applicable wavelength range preferably refers to minimizing the maximum singularity of the polarization characteristic transfer matrix in the applicable wavelength range, minimizing the average singularity of the polarization characteristic transfer matrix in the applicable wavelength range, or minimizing the mean square deviation of the singularity of the polarization characteristic transfer matrix in the applicable wavelength range.

Further, determination of the overall structure of the composite waveplate by the thicknesses and the intersection angles between the fast axes of the respective single-waveplates according to the optimization design of the polarization characteristic transfer matrix comprises the following steps:

(1) determining an applicable wavelength range $\Gamma$ of the polarization modulator, manufacture material of the composite waveplate and the number N of the single-waveplates; and selecting a thickness variation range $\Omega$ and a variation range $\Theta$ of intersection angles between the fast axes of the respective single-waveplates of the composite waveplate;

(2) respectively selecting thicknesses $[d_1, d_2, \ldots, d_N]$ and fast axis intersection angles (i.e., the intersection angles between the fast axes of the single-waveplates and that of the chosen reference single-waveplate) $[\Delta\theta_1, \Delta\theta_2, \ldots, \Delta\theta_N]$ of N single-waveplates in the thickness variation range $\Omega$ and the variation range $\Theta$ of intersection angles between the fast axes;

(3) establishing a polarization characteristic transfer matrix $D(\lambda)$ of the polarization modulator according to the selected thicknesses and fast axis intersection angles of the single-waveplates, and then calculating the maximum singularity $\zeta_{max}$ of the polarization characteristic transfer matrix $D(\lambda)$ of the polarization modulator in the wavelength range $\Gamma$:

$$\zeta_{max} = \max_{\lambda \in \Gamma}\{\tau(\lambda)\zeta[D(\lambda)]\}$$

wherein $\tau(\lambda)$ represents a coefficient related to the wavelength $\lambda$; and $\zeta$ represents the evaluation criterion of the singularity of the polarization characteristic transfer matrix; and (4) repeating the steps (2)-(3) to minimize the maximum singularity $\zeta_{max}$ of the polarization characteristic transfer matrix of the polarization modulator in the wavelength range $\Gamma$, at which time the thicknesses and the fast axis intersection angles of the single-waveplates of the composite waveplate are parameters of the overall structure of the composite waveplate.

Further, the polarization characteristic transfer matrix $D(\lambda)$ is calculated by the following formula:

$$D(\lambda)=f\{([\delta_1(\lambda),\delta_2(\lambda),\ldots,\delta_N(\lambda)];[\theta_1(\lambda),\theta_2(\lambda),\ldots,\theta_N(\lambda)];P\}$$

wherein f represents a function relationship determined by the polarization transfer characteristic of the polarization modulator, P represents the transmission axis azimuth of the polarizer, $\delta_1(\lambda), \delta_2(\lambda), \ldots, \delta_N(\lambda)$ respectively represent phase retardations of the 1st, 2nd, . . . , N-th single-waveplates, and $\theta_1(\lambda), \theta_2(\lambda), \ldots, \theta_N(\lambda)$ respectively represents fast axis azimuths of the 1st, 2nd, . . . , n-th, . . . , N-th single-waveplates.

Further, the phase retardation of the respective single-waveplate is determined by the thickness of the respective single-waveplate:

$$\delta_n(\lambda) = \frac{2\pi \cdot d_n \cdot \Delta n(\lambda)}{\lambda}$$

wherein $\delta_n(\lambda)$ represents the phase retardation of the n-th single-waveplate, $d_n$ represents the thickness of the n-th single-waveplate, $\lambda$ represents the operating wavelength, $\lambda \in \Gamma$, and $\Delta n(\lambda)$ represents the birefringence of the manufacture material of the waveplate at the wavelength $\lambda$.

Further, the fast axis azimuth of the respective single-waveplate is determined by the fast axis intersection angle and the fast axis azimuth of a reference single-waveplate:

$$\theta_n(\lambda)=\theta_{N0}+\Delta\theta_n$$

wherein $\theta_n(\lambda)$ represents the fast axis azimuth of the n-th single-waveplate, $\Delta\theta$ represents the intersection angle between the fast axis of the n-th single-waveplate and the fast axis of the reference single-waveplate, and $\theta_{N0}$ represents the fast axis azimuth of the reference single-waveplate.

According to another aspect of the present invention, there is provided a polarization measurement system, comprising at least one polarization modulator.

Further, polarization characteristics of devices and polarized lights of the polarization measurement system are represented by a Mueller matrix or a Stokes vector, in which the devices are a rotating compensator and a polarizer in the polarization measurement system, and the polarized lights are the incident light and the emergent light of the respective devices.

Further, the polarization measurement system is an ellipsometer based on single rotating compensator, an ellipsometer based on dual rotating compensators or a Stokes polarimeter based on rotating compensator.

In general, by comparing the above technical solution of the present invention with the prior art, the present invention has the following beneficial effects:

(1) in the present invention, a polarization modulator based on a composite waveplate rotating compensator combined with a polarizer is designed and can be used as a basic polarization modulation unit applied to the polarization measurement system, in which the composite waveplate rotating compensator is a composite waveplate composed of a plurality of single-waveplates of the same material, and its overall structure is determined by thicknesses and intersection angles between the fast axes of the respective single-waveplates, which does not limit the specific structure of the composite waveplate, thicknesses and fast axis azimuths of the respective single-waveplates and the like, and provides more freedom for optimizing the polarization modulation performance of the composite waveplate.

(2) system parameters of the polarization modulator of the present invention, including the azimuth of the polarizer and thicknesses and fast axis azimuths of the respective single-waveplates of the composite waveplate are obtained according to the optimization design of the polarization characteristic transfer matrix of the polarization modulator, so that the overall structure of the composite waveplate can be optimized to allow the polarization measurement system to have optimal polarization modulation performance over a wider wavelength range, which is adapted to the requirements of wide-waveband precision polarization measurements.

(3) in the present invention, a polarization measurement system is further provided, which at least comprises a basic polarization modulation unit based on a composite waveplate rotating compensator combined with a polarizer. The composite waveplate rotating compensator is used as the core polarization modulation element, so that the polarization measurement system is convenient in optical path adjustment and simple in system calibration, and can be adapted to a wider wavelength range and meet the requirements of wide-waveband (for example, a wide-waveband polarization measurement system covering the wavelength range of 200-1700 nm can be designed) precision polarization measurements.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
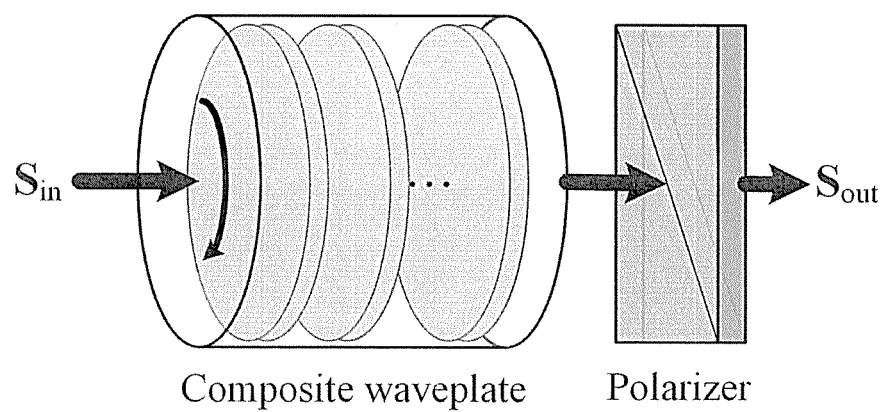
FIG. 1 is a schematic diagram of a polarization modulator according to an embodiment of the present invention.

As shown in FIG. 1, a polarization modulator (i.e., a basic polarization modulation unit) provided by embodiments of the present invention includes a rotating compensator and a polarizer that are sequentially disposed from front to rear. The transmission axis azimuth of the polarizer is preset and fixed during the operation of the polarization modulator. The rotating compensator is a continuously rotating composite waveplate. The composite waveplate (i.e., the rotating compensator) is composed of a plurality of single-waveplates of the same material. The overall structure of the composite waveplate is determined by thicknesses and intersection angles between the fast axes of the respective single-waveplates according to the optimization design of the polarization characteristic transfer matrix of the polarization modulator, that is, the overall structure of the composite waveplate is uniquely determined by thicknesses and intersection angles between the fast axes of the respective single-waveplates, and then the thicknesses and the intersection angles between the fast axes of the single-waveplates are determined according to the optimization design of the polarization characteristic transfer matrix of the polarization modulator.

Specifically, in the process of determining the overall structure of the composite waveplate according to the optimization design of the polarization characteristic transfer matrix of the polarization modulator, the criterion is that the singularity of the polarization characteristic transfer matrix of the polarization modulator is minimized in the applicable wavelength range, in which the applicable wavelength range is selected according to the specific application of the designed polarization measurement system. In the criterion, minimizing the singularity in the applicable wavelength range refers to minimizing the maximum singularity of the polarization characteristic transfer matrix in the applicable wavelength range, minimizing the average singularity of the polarization characteristic transfer matrix in the applicable wavelength range, or minimizing the mean square deviation of the singularity of the polarization characteristic transfer matrix in the applicable wavelength range.

The polarization transfer characteristic of the above polarization modulator can be expressed by the following formula:

$$S_{out} = M_P \cdot M_C \cdot S_{in} \qquad (1)$$

wherein $S_{in}$ and $S_{out}$ represent Stokes vectors of the polarized lights incident on the polarization modulator and emitted from the polarization modulator, respectively, and $M_P$ and $M_C$ represent Mueller matrixes of the polarizer and the rotating compensator, respectively.

Further, the Mueller matrix $M_P$ of the polarizer is calculated by the following formula:

$$M_P = \begin{bmatrix} 1 & 0 & 0 & 0 \\ 0 & \cos(2P) & -\sin(2P) & 0 \\ 0 & \sin(2P) & \cos(2P) & 0 \\ 0 & 0 & 0 & 1 \end{bmatrix} \begin{bmatrix} 1 & 1 & 0 & 0 \\ 1 & 1 & 0 & 0 \\ 0 & 0 & 0 & 0 \\ 0 & 0 & 0 & 1 \end{bmatrix} \qquad (2)$$

$$\begin{bmatrix} 1 & 0 & 0 & 0 \\ 0 & \cos(2P) & \sin(2P) & 0 \\ 0 & -\sin(2P) & \cos(2P) & 0 \\ 0 & 0 & 0 & 1 \end{bmatrix}$$

wherein P represents the transmission axis azimuth of the polarizer.

Figure 2:
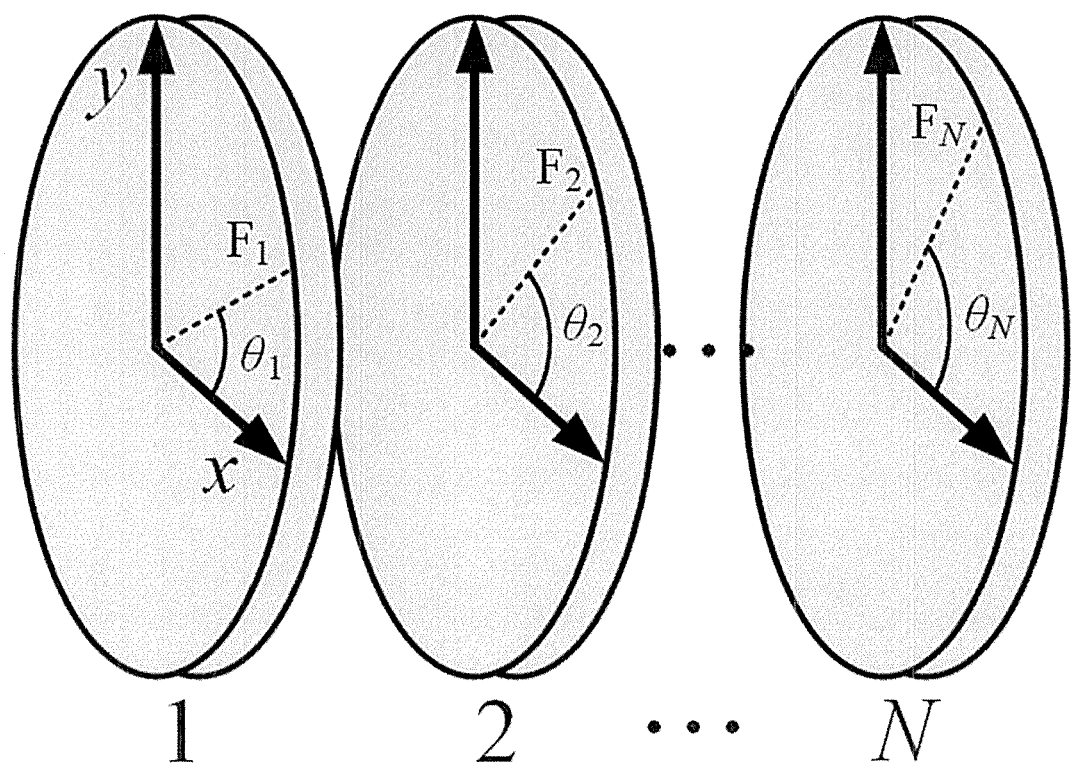
FIG. 2 is a schematic structural diagram of a composite waveplate according to the embodiment of the present invention.

The composite waveplate is formed by combining N single-waveplates of the same material as a whole, and its overall structure is determined by thicknesses and intersection angles between the fast axes of the respective single-waveplates. The structure of the composite waveplate is as shown in FIG. 2. In the direction of light propagation, the respective single-waveplates are sequentially denoted as 1, 2, . . . , N. $F_n$ and $\theta_n$ respectively represent the fast axis of the n-th single-waveplate and its azimuth, and the thickness of the n-th single-waveplate is $d_n$, wherein n=1, 2, . . . , N. The fast axis of the first single-waveplate is selected as the reference axis, and then the intersection angle between the fast axis of the respective single-waveplate and the fast axis of the first single-waveplate is $\Delta\theta_n = \theta_n - \theta_1$, wherein n=1, 2, . . . , N. During the rotation, the thickness and the intersection angle between the fast axes of the respective single-waveplate and the reference single-waveplate (i.e., the first single-waveplate in this embodiments of the present invention) of the composite waveplate as a whole are not changed.

The Jones matrix U of the composite waveplate can be calculated according to the thicknesses and the fast axis azimuths of the respective single-waveplates, and the specific calculation formula is as follow:

$$U = \prod_{n=1}^{N} \left\{ \begin{bmatrix} \cos\theta_n & -\sin\theta_n \\ \sin\theta_n & \cos\theta_n \end{bmatrix} \begin{bmatrix} e^{i\delta_n/2} & 0 \\ 0 & e^{-i\delta_n/2} \end{bmatrix} \begin{bmatrix} \cos\theta_n & \sin\theta_n \\ -\sin\theta_n & \cos\theta_n \end{bmatrix} \right\} = \begin{bmatrix} u_{11} & u_{12} \\ u_{21} & u_{22} \end{bmatrix} \quad (3)$$

wherein $u_{11}$, $u_{12}$, $u_{21}$ and $u_{22}$ represent elements of the Jones matrix of the composite waveplate, $\delta_n$ and $\theta_n$ respectively represent the phase retardation and the fast axis azimuth of the n-th (n=1, 2, . . . , N) single-waveplate, and i represents the imaginary unit, in which $\delta_n$ can be calculated by the following formula:

$$\delta_n = \frac{2\pi \cdot d_n \cdot \Delta n(\lambda)}{\lambda} \quad (4)$$

wherein $d_n$ represents the thickness of the n-th single-waveplate, $\lambda$ represents the operating wavelength of the composite waveplate, and $\Delta n(\lambda)$ represents the birefringence of the waveplate material at the wavelength $\lambda$, which can be obtained by referring to the data.

According to Jones' equivalent theory, the polarization characteristic of the composite waveplate can be described by three equivalent polarization characteristic parameters: equivalent phase retardation $\delta_e$, equivalent fast axis azimuth $\theta_e$ and equivalent optical rotation angle $\rho_e$. The Jones matrix U can also be described by the following formula:

$$U = \begin{bmatrix} u_{11} & u_{12} \\ u_{21} & u_{22} \end{bmatrix} = \begin{bmatrix} \cos\rho_e & \sin\rho_e \\ -\sin\rho_e & \cos\rho_e \end{bmatrix} \begin{bmatrix} \cos\theta_e & -\sin\theta_e \\ \sin\theta_e & \cos\theta_e \end{bmatrix} \begin{bmatrix} e^{i\delta_e/2} & 0 \\ 0 & e^{-i\delta_e/2} \end{bmatrix} \begin{bmatrix} \cos\theta_e & \sin\theta_e \\ -\sin\theta_e & \cos\theta_e \end{bmatrix} \quad (5)$$

The formulas (3)-(5) are combined to obtain values of the equivalent polarization characteristic parameters of the composite waveplate at different wavelengths of $\lambda$ as follows:

$$\delta_e(\lambda) = 2\tan^{-1}\left[\sqrt{\frac{\text{Im}^2(u_{11}) + \text{Im}^2(u_{12})}{\text{Re}^2(u_{11}) + \text{Re}^2(u_{12})}}\right] \quad (6a)$$

$$\theta_e(\lambda) = \frac{1}{2}\tan^{-1}\left[\frac{\text{Re}(u_{11})\text{Im}(u_{12}) + \text{Im}(u_{11})\text{Re}(u_{12})}{\text{Re}(u_{11})\text{Im}(u_{11}) - \text{Re}(u_{12})\text{Im}(u_{12})}\right] \quad (6b)$$

$$\rho_e(\lambda) = \tan^{-1}\left[\frac{\text{Re}(u_{12})}{\text{Re}(u_{11})}\right] \quad (6c)$$

wherein Im represents the imaginary part of the complex number, and Re represents the real part of the complex number.

Therefore, the Mueller matrix $M_C$ of the above-described composite waveplate rotating compensator can be calculated by the following formula:

$$M_C = \begin{bmatrix} 1 & 0 & 0 & 0 \\ 0 & \cos(2\rho_e) & \sin(2\rho_e) & 0 \\ 0 & -\sin(2\rho_e) & \cos(2\rho_e) & 0 \\ 0 & 0 & 0 & 1 \end{bmatrix} \begin{bmatrix} 1 & 0 & 0 & 0 \\ 0 & \cos(\theta_t) & -\sin(\theta_t) & 0 \\ 0 & \sin(\theta_t) & \cos(\theta_t) & 0 \\ 0 & 0 & 0 & 1 \end{bmatrix} \quad (7)$$

$$\begin{bmatrix} 1 & 0 & 0 & 0 \\ 0 & 1 & 0 & 0 \\ 0 & 0 & \cos\delta_e & \sin\delta_e \\ 0 & 0 & -\sin\delta_e & \cos\delta_e \end{bmatrix} \begin{bmatrix} 1 & 0 & 0 & 0 \\ 0 & \cos(2\theta_t) & \sin(2\theta_t) & 0 \\ 0 & -\sin(2\theta_t) & \cos(2\theta_t) & 0 \\ 0 & 0 & 0 & 1 \end{bmatrix}$$

wherein $\theta_t = \theta_e + \omega t$ represents the fast axis azimuth of the composite waveplate rotating compensator at any time t, and $\omega$ represents the rotational angular rate of the composite waveplate.

By substituting formulas (2) and (7) into the formula (1), the light intensity detected by the light intensity detector of the polarization measurement system, i.e., the first element $S_{out}(1)$ of the Stokes vector of the emitted polarized light of the polarization modulator, can be calculated, and the specific expression is as follow:

$$I(t) = S_{out}(1) = a_0 + a_{2m}\cos(2m\omega t + \Phi_{2m}) + b_{2m}\sin(2m\omega t + \Phi_{2m}) \quad (8)$$

wherein $a_0$ and ($a_{2m}$, $b_{2m}$) respectively represent the DC component and the normalized AC components of the Fourier coefficients, $\Phi_{2m} = 2m\theta_e$ represents a phase function, m=1, 2 represents the Fourier coefficient order, $\omega$ represents the rotation angular rate of the composite waveplate, and t represents the rotation time.

The specific expressions of the respective Fourier coefficients are as follows:

$$a_0 = S_1 + \cos^2\left(\frac{\delta_e}{2}\right)\cos(2P') \cdot S_2 + \cos^2\left(\frac{\delta_e}{2}\right)\sin(2P') \cdot S_3 + 0 \cdot S_4 \quad (9a)$$

$$a_2 = 0 \cdot S_1 + 0 \cdot S_2 + 0 \cdot S_3 + \sin(\delta_e)\sin(2P') \cdot S_4 \quad (9b)$$

$$b_2 = 0 \cdot S_1 + 0 \cdot S_2 + 0 \cdot S_3 - \sin(\delta_e)\cos(2P') \cdot S_4 \quad (9c)$$

$$a_4 = 0 \cdot S_1 + \sin^2\left(\frac{\delta_e}{2}\right)\cos(2P') \cdot S_2 - \sin^2\left(\frac{\delta_e}{2}\right)\sin(2P') \cdot S_3 + 0 \cdot S_4 \quad (9d)$$

$$b_4 = 0 \cdot S_1 + \sin^2\left(\frac{\delta_e}{2}\right)\sin(2P') \cdot S_2 + \sin^2\left(\frac{\delta_e}{2}\right)\cos(2P') \cdot S_3 + 0 \cdot S_4 \quad (9e)$$

wherein $S_i$ (i=1, 2, 3, 4) represents the i-th element of the Stokes vector $S_{in}$ of the incident polarized light of the polarization modulator, and $P'=P+\rho_e$ represents the transmission axis azimuth P of the polarizer coupling the equivalent optical rotation angle $\rho_e$ of the composite waveplate rotating compensator.

Fourier transformation is performed on the light intensity signal actually detected by the light intensity detector of the polarization measurement system, and the following expression is obtained:

$$I'(t)=S_{out}(1)=a_0'+a_{2m}'\cos(2m\omega t)+b_{2m}'\sin(2m\omega t) \quad (10)$$

wherein $a_0'$ and ($a_{2m}'$, $b_{2m}'$) respectively represent the DC component and the normalized AC components of the Fourier coefficients of the actually detected light intensity signal, and m=1, 2 represents the Fourier coefficient order. The Fourier coefficients have the following relationship:

$$a_0'=a_0 \quad (11a)$$

$$a_{2m}'=a_{2m}\cos\Phi_{2m}-b_{2m}\sin\Phi_{2m} \quad (11b)$$

$$b_{2m}'=a_{2m}\sin\Phi_{2m}+a_{2m}\cos\Phi_{2m} \quad (11c)$$

Preferably, the light intensity is detected by using a spectrometer, and the applicable wavelength range of the spectrometer should cover the applicable wavelength range of the polarization measurement system. When the light intensity detector is a spectrometer, the detection signal is the integral of the light intensity signal given by the formula (10) over a period of time. Generally, in the optical period $T=\pi/w$ of the rotating compensator, light intensity signal acquisition is performed K times, and the integral time interval is $[(k-1)\pi/(K\omega), k\pi/(K\omega)]$, wherein k=1, 2, ..., K. In order to ensure that the polarization measurement system can obtain a stable solution, the number of times K of light intensity signal acquisition in one optical period should be greater than or equal to the number of polarization parameters to be measured of the polarization measurement system.

The specific expression of the light intensity signal $g_k$ detected by the spectrometer is:

$$g_k = \int_{\frac{(k-1)\pi}{K\omega}}^{\frac{k\pi}{K\omega}} I'(t)dt = \frac{\pi a_0'}{K\omega} + \sum_{m=1}^{2}\frac{1}{n\omega}\left(\sin\frac{m\pi}{K}\right)\left[a_{2m}'\cos\frac{(2k-1)m\pi}{K}+b_{2m}'\sin\frac{(2k-1)m\pi}{K}\right] \quad (12)$$

The above formula can be rewritten as a matrix form:

$$G=D\cdot S_{in} \quad (13)$$

wherein $G=[g_1, g_2, \ldots, g_K]^T$ is a K×1-dimension column vector composed of light intensity signals $g_k$ collected by the spectrometer, $S_{in}=[S_1, S_2, S_3, S_4]^T$ is the Stokes vector of the incident polarized light of the polarization modulator, and D is the polarization characteristic transfer matrix of the polarization modulator.

D can be derived by the above formula (13), which is a conventional mathematical operation and will not be described herein. The derived D is a K×4 order matrix composed of systematic parameters such as the equivalent phase retardation $\delta_e$, the equivalent fast axis azimuth $\theta_e$ and the equivalent optical rotation angle $\rho_e$ of the composite waveplate as well as the transmission axis azimuth P of the polarizer.

In the present invention, the singularity of the polarization characteristic transfer matrix D is adopted to evaluate the ability of the polarization modulator and the polarization measurement system based on the invented polarization modulator to resist noise and error. The farther the polarization characteristic transfer matrix D is away from the singularity, the more stable the solution of the linear equation shown the formula (13) is, and the stronger the ability of the polarization measurement system to resist noise and error is, otherwise, the weaker the ability of the polarization measurement system to resist noise and error is. That is, in the process of determining the thicknesses and fast axis intersection angles of the respective single-waveplates, the criterion is that the singularity of the polarization characteristic transfer matrix of the polarization modulator is minimized in the applicable wavelength range. In the criterion, minimizing the singularity in the applicable wavelength range refers to minimizing the maximum singularity of the polarization characteristic transfer matrix in the applicable wavelength range, minimizing the average singularity of the polarization characteristic transfer matrix in the applicable wavelength range, or minimizing the mean square deviation of the singularity of the polarization characteristic transfer matrix in the applicable wavelength range.

The singularity of the polarization characteristic transfer matrix can be quantitatively evaluated by parameters such as the condition number, singular value, and eigenvalue of the polarization characteristic transfer matrix. For better understanding of the present invention, the condition number evaluation method is exemplified herein. The condition number of the polarization characteristic transfer matrix D of the polarization modulator can be calculated by the following formula:

$$\kappa_p(D)=\|D\|_p\|D^+\|_p \quad (14)$$

wherein $D^+=(D^TD)^{-1}D^T$ represents the pseudo-inverse matrix of the matrix D, and $\|\ \|_p$ represents the p-norm of the matrix, wherein p=1, 2, ∞. The smaller the condition number is, the smaller the singularity of the polarization characteristic transfer matrix is, the farther the matrix is away from the singularity, the more stable the solution of the linear equation is, and the stronger the ability of the corresponding polarization measurement system to resist noise and error is.

It can be seen from the formulas (8)-(13) that the polarization characteristic transfer matrix D of the polarization modulator based on the composite waveplate rotating compensator is finally determined by the equivalent phase retardation $\delta_e$, the equivalent fast axis azimuth $\theta_e$ and the equivalent optical rotation angle $\rho_e$ of the composite waveplate as well as the transmission axis azimuth P of the polarizer. Since the equivalent phase retardation $\delta_e$, the equivalent fast axis azimuth $\theta_e$ and the equivalent optical rotation angle $\rho_e$ of the composite waveplate all have the dispersion characteristic and are functions of the wavelength λ, the polarization characteristic transfer matrix D of the polarization modulator based on the composite waveplate rotating compensator varies with the wavelength λ, and then the singularity of the polarization characteristic transfer matrix D also varies with the wavelength λ. As can be seen from the above, the polarization characteristic parameters such as the equivalent phase retardation $\delta_e$, the equivalent fast axis azimuth $\theta_e$ and the equivalent optical rotation angle $\rho_e$ of the composite waveplate in the present invention are determined by its overall structure and material properties, and its overall structure is determined by the thicknesses $d=[d_1, d_2, \ldots, d_N]$ and the fast axis intersection angles $\Delta\theta=[\Delta\theta_1, \Delta\theta_2, \ldots, \Delta\theta_N]$ of the respective single-waveplates. In order to allow the polarization measurement system based on the composite waveplate rotating compensator in the present invention to have strong performance such as noise and error resistance in a wide wavelength range, the present invention utilizes the polarization characteristic transfer matrix D of the polarization modulator to perform optimal design on the overall structure of the composite waveplate, so that the respective single-waveplates of the composite waveplate have optimal thicknesses and intersection angles between their fast axes, the maximum singularity of the polarization characteristic transfer matrix D of the polarization modulator is minimized in the required wavelength range Γ, and then the polarization measurement system based on the composite waveplate rotating compensator has the optimal performance such as noise and error resistance in the wavelength range Γ.

When the condition number is used as a criterion for evaluating the singularity of the polarization characteristic transfer matrix, the optimization design criterion of the overall structure of the composite waveplate can be expressed in the form shown in the following formula:

$$(d_o, \Delta\theta_o) = \arg \min_{(d \in \Omega; \Delta\theta \in \Theta)} \{\max_{\lambda \in \Gamma} [\tau(\lambda)\kappa_P(D(\lambda))]\} \quad (15)$$

wherein $\tau(\lambda)$ is a coefficient that varies with the wavelength, $d=[d_1, d_2, \ldots, d_N]$ and $\Delta\theta=[\Delta\theta_1, \Delta\theta_2, \ldots, \Delta\theta_N]$ respectively represent a set of thicknesses and a set of fast axis intersection angles of the respective single-waveplates of the composite waveplate, $d_0=[d_{1o}, d_{2o}, \ldots, d_{No}]$ and $\Delta\theta_0=[\Delta\theta_{1o}, \Delta\theta_{2o}, \ldots, \Delta\theta_{No}]$ respectively represent a set of optimization design values of thicknesses and a set of optimization design values of fast axis intersection angles of the respective single-waveplates of the composite waveplate, Ω and Θ respectively represent the thickness variation range and the variation range of fast axis intersection angles of the respective single-waveplates of the composite waveplate, arg represents the optimization design process, min represents the selection of the minimum value of the objective function within a certain range, and max represents the selection of the maximum value of the objective function within a certain range.

Therefore, the optimization design process expressed by the formula (15) can be described as: parameters of the optimally designed overall structure of the composite waveplate are thicknesses and fast axis intersection angles of the respective single-waveplates of the composite waveplate that minimize the maximum value of the condition number of the polarization characteristic transfer matrix of the polarization modulator in the applicable wavelength range Γ of the polarization measurement system as well as the thickness variation range Ω and the variation range Θ of fast axis intersection angles of the respective single-waveplates of the composite waveplate.

Specifically, the overall structure of the composite waveplate is determined by the following steps:

(1) determining the applicable wavelength range Γ of the polarization modulator, determining the manufacture material of the composite waveplate and the number N of the single-waveplates, and selecting the thickness variation range Ω and the variation range Θ of fast axis intersection angles of the respective single-waveplates of the composite waveplate (the above parameters can be selected and determined according to actual requirements);

(2) respectively selecting thicknesses $[d_1, d_2, \ldots, d_N]$ and fast axis intersection angles $[\Delta\theta_1, \Delta\theta_2, \ldots, \Delta\theta_n, \ldots, \Delta\theta_N]$ of N single-waveplates in the thickness variation range Ω and the variation range Θ of fast axis intersection angles, wherein $d_n$ represents a thickness of the n-th (n=1, 2, . . . , N) single-waveplate, $\Delta\theta_n$ represents an intersection angle between the fast axis of the n-th (n=1, 2, . . . , N) single-waveplate and the fast axis of a reference single-waveplate, and for example, when the N0-th (1≤N0≤N) single-waveplate is selected as a reference single-waveplate, $\Delta\theta_{N0}=0$ (the reference single-waveplate can be selected according to actual requirements);

(3) establishing a polarization characteristic transfer matrix $D(\lambda)$ of the polarization modulator according to the selected thicknesses and fast axis intersection angles of the single-waveplates, and then calculating the maximum singularity $\zeta_{max}$ of the polarization characteristic transfer matrix D0) in the wavelength range r:

$$\zeta_{max} = \max_{\lambda \in \Gamma} \{\tau(\lambda)\zeta[D(\lambda)]\}$$

wherein $\tau(\lambda)$ represents a coefficient related to the wavelength $\lambda$, which is generally given 1; $\zeta$ represents the evaluation criterion of the singularity of the polarization characteristic transfer matrix (for example, the condition number, singular value or eigenvalue of the polarization characteristic transfer matrix is used as the evaluation criterion, and the specific evaluation criterion can be selected according to actual needs, which belongs to the prior art and are not described here);

the polarization characteristic transfer matrix $D(\lambda)$ is determined by the formulas (8)-(13) and can be expressed as follow:

$$D(\lambda)=f\{[\delta_1(\lambda), \delta_2(\lambda), \ldots, \delta_N(\lambda)]; [\theta_1(\lambda), \theta_2(\lambda), \ldots, \theta_N(\lambda)]; P\};$$

wherein $f$ represents a function relationship determined by the polarization transfer characteristic of the polarization modulator, specifically determined by the light intensity detection mode of the light intensity detector, P represents the transmission axis azimuth of the polarizer, $\delta_1(\lambda)$, $\delta_2(\lambda), \ldots, \delta_n(\lambda), \ldots, \delta_N(\lambda)$ respectively represent phase retardations of the 1st, 2nd, . . . , n-th, . . . , N-th single-waveplates, and $\theta_1(\lambda), \theta_2(\lambda), \ldots, \theta_n(\lambda), \ldots, \theta_N(\lambda)$ respectively represents fast axis azimuths of the 1st, 2nd, . . . , n-th, . . . , N-th single-waveplates;

the phase retardation of the respective single-waveplate is determined by the thickness of the respective single-waveplate:

$$\delta_n(\lambda) = \frac{2\pi \cdot d_n \cdot \Delta n(\lambda)}{\lambda}$$

wherein $\delta_n(\lambda)$ represents the phase retardation of the n-th (n=1, 2, . . . , N) single-waveplate, $d_n$ represents the thickness of the n-th single-waveplate, λ represents the operating wavelength of the composite waveplate, ΔΣΓ, and $\Delta n(\lambda)$ represents the birefringence of the manufacture material of the waveplate at the wavelength λ;

the fast axis azimuth of the respective single-waveplate is determined by the fast axis intersection angle and the fast axis azimuth of the reference single-waveplate:

$$\theta_n(\lambda)=\theta_{N0}+\Delta\theta_n$$

wherein $\theta_n(\lambda)$ represents the fast axis azimuth of the n-th (n=1, 2, . . . , N) single-waveplate, $\Delta\theta_n$ represents the intersection angle between the fast axis of the n-th single-waveplate and the fast axis of the reference single-waveplate, and $\theta_{N0}$ represents the fast axis azimuth of the reference single-waveplate.

(4) repeating the steps (2)-(3) to minimize the maximum singularity $\zeta_{max}$ of the polarization characteristic transfer matrix of the polarization modulator in the wavelength range $\Gamma$, at which time the thicknesses and the fast axis intersection angles of the single-waveplates of the composite waveplate are parameters of the overall structure of the composite waveplate, namely, reselecting thicknesses and fast axis intersection angles of the respective single-waveplates of the composite waveplate in the thickness variation range $\Omega$ and the variation range $\Theta$ of the fast axis intersection angle, until the thicknesses and the fast axis intersection angles of the respective single-waveplates of the composite waveplate selected in the step (2) traverse the thickness variation range $\Omega$ and the variation range $\Theta$ of the fast axis intersection angles, at which time thicknesses $[d_{1o}, d_{2o}, \ldots, d_{No}]$ and fast axis intersection angles $[\Delta\theta_{1o}, \Delta\theta_{2o}, \ldots, \Delta\theta_{No}]$ of the respective single-waveplates of the composite waveplate that minimize the maximum singularity $\zeta_{ax}$ of the polarization characteristic transfer matrix in the wavelength range $\Gamma$ are parameters of the overall structure of the composite waveplate.

For the composite waveplate, the light transmission wavelength range of the selected manufacture material should cover the applicable wavelength range $\Gamma$ of the polarization measurement system, including but not limited to quartz, magnesium fluoride, calcite, mica, gypsum or sapphire. The single-waveplate of the composite waveplate may be a single birefringent crystal plate, or composed of two birefringent crystal plates whose fast axes are orthogonally arranged. When the single-waveplate of the composite waveplate is a single birefringent crystal plate, the thickness and the fast axis azimuth of the single-waveplate are determined by the thickness and the optical axis azimuth of the birefringent crystal plate; when the single-waveplate of the composite waveplate is composed of two birefringent crystal plates, the thickness of the single-waveplate is determined by the difference between the thicknesses of the two birefringent crystal plates, and the fast axis azimuth of the single-waveplate is determined by the optical axis azimuth of the thicker birefringent crystal plate. By using the polarization modulator of the present invention as a basic unit, a polarization measurement system including at least one polarization modulator can be constructed, and the polarization measurement system is further provided with a light intensity detector for the purpose of facilitating measurement of light intensity.

For more easily understanding and implementing of the present invention, the specific implementation of the present invention will be described in detail below with the design of the polarization measurement system based on the composite waveplate with a wavelength range of 200-1700 nm as a specific embodiment.

Figure 3:
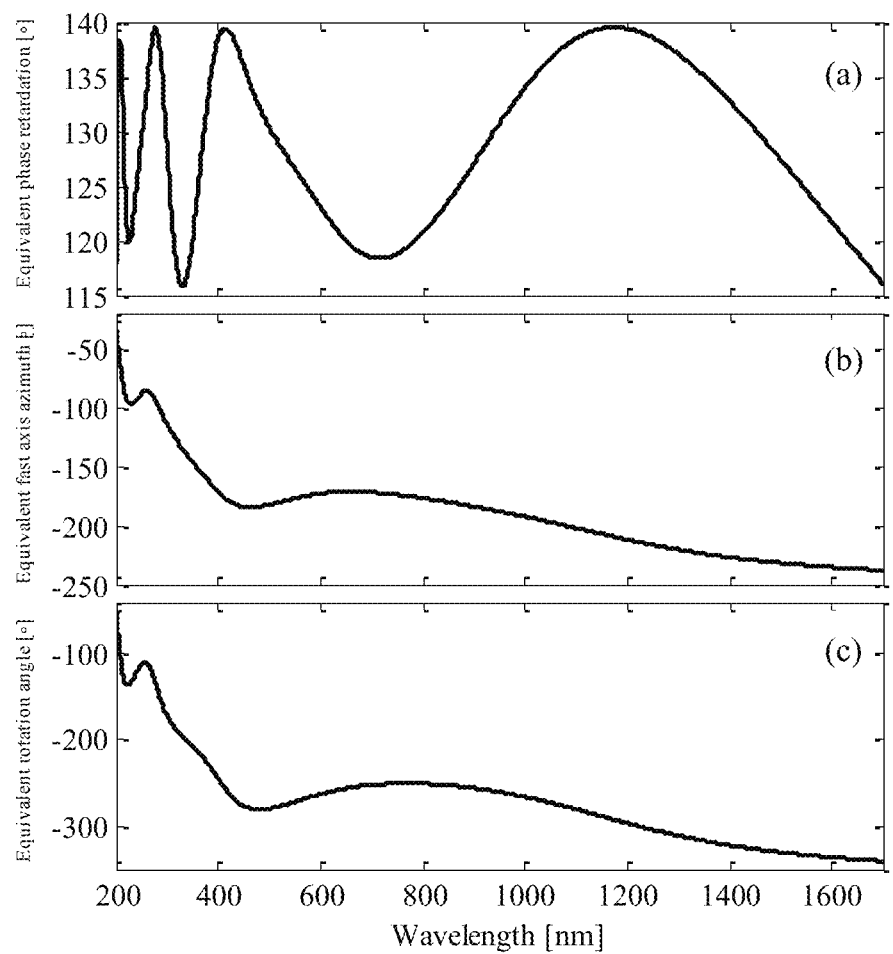
FIG. 3 shows spectral curves of equivalent polarization characteristic parameters of a composite waveplate rotating compensator comprising four magnesium fluoride single-waveplates designed and optimized by the present invention in a designed wavelength range of 200-1700 nm, in which (a) of FIG. 3 represents a spectral curve of the equivalent phase retardation, (b) of FIG. 3 represents a spectral curve of the equivalent optical axis azimuth and (c) of FIG. 3 represents a spectral curve of the equivalent optical rotation angle.
Figure 4:
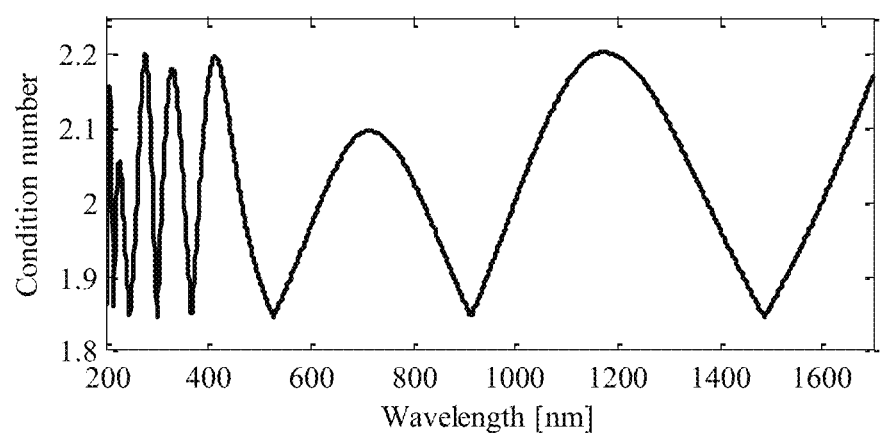
FIG. 4 shows a spectral curve of the 2-norm condition number of the polarization characteristic transfer matrix of the basic polarization modulation unit based on the composite waveplate rotating compensator comprising four magnesium fluoride single-waveplates designed and optimized by the present invention in the designed wavelength range of 200-1700 nm.

(1) Selecting an applicable wavelength range $\Gamma$ of the polarization measurement system. Specifically, according to the wide waveband measurement requirements of the polarization measurement system, a wavelength range of 200-1700 nm covering the ultraviolet-visible-infrared is selected as the applicable wavelength range of the polarization measurement system to be designed, that is, $\Gamma=[200\ nm, 1700\ nm]$;

(2) Selecting a polarizer and a light intensity detector, the applicable wavelength range of which should cover the wavelength range $\Gamma$ selected in the step (1). In this embodiment, the Rochon polarizer and the spectrometer are respectively selected as the polarizer and the light intensity detector of the polarization measurement system;

(3) Determining the overall structure of the composite waveplate according to the following steps:

3.1) selecting the manufacture material of the composite waveplate and the number N of single-waveplates of the composite waveplate, in which the light transmission wavelength range of the selected material covers the wavelength range $\Gamma$ selected in the step (1); the number N of the single-waveplates is determined by taking into comprehensive consideration the difficulty in manufacturing the waveplates and the applicable wavelength range of the polarization measurement system, and in the present embodiment, magnesium fluoride is selected as the manufacture material of the composite waveplate, and the number N of the single-waveplates is selected to be 4;

3.2) selecting a thickness variation range $\Omega$ and a variation range $\Theta$ of fast axis intersection angles of the respective single-waveplates of the composite waveplate. In the present embodiment, the thickness variation range $\Omega$ and the variation range $\Theta$ of fast axis intersection angles of the magnesium fluoride single-waveplates are respectively [0, 100 μm] and [0, 90°];

3.3) arbitrarily selecting thicknesses $[d_1, d_2, d_3, d_4]$ and fast axis intersection angles $[\Delta\theta_1, \Delta\theta_2, \Delta\theta_3, \Delta\theta_4]$ of the respective single-waveplates of the composite waveplate in the the thickness variation range $\Omega$ and the variation range $\Theta$ of fast axis intersection angles selected in the step 3.2), wherein $d_n$ represents the thickness of the n-th (n=1, 2, 3, 4) single-waveplate, and $\Delta\theta_n$ represents the intersection angle between the fast axis of the n-th (n=1, 2, 3, 4) single-waveplate and the fast axis of the reference single-waveplate. For the convenience of description, the first single-waveplate is selected as the reference single-waveplate, i.e., $\Delta\theta_1=0$;

3.4) calculating system parameters of the basis polarization modulation unit (i.e., the invented polarization modulator) based on the composite waveplate rotating compensator: firstly, arbitrarily setting an fast axis azimuth $\theta_1$ of the first single-waveplate of the composite waveplate and a transmission axis azimuth P of the polarizer (the fast axis azimuth $\theta_1$ of the first single-waveplate of the composite waveplate and the transmission axis azimuth P of the polarizer may or may not be optimized, and in the present embodiment, the two parameters are not optimized, that is, they are always unchanged after being set); then, calculating a phase retardation $\delta_n$ and an fast axis azimuth $\theta_n$ of the respective single-waveplate of the composite waveplate, in which according to the thickness $d_n$ of the respective single-waveplate, a wavelength $\lambda$ and a birefringence $\Delta n(\lambda)$ of the magnesium fluoride, the phase retardation $\delta_n$ can be calculated by the formula (4); and the fast axis azimuth $\theta_n$ can be calculated according to the fast axis azimuth $\theta_1$ of the first single-waveplate and the fast axis intersection angle $\Delta\theta_n$, i.e., $\theta_n=\theta_1+\Delta\theta_n$; finally, according to the phase retardations $\delta_n$ and the fast axis azimuths $\theta_n$ of the respective single-waveplates of the composite waveplate, obtaining an equivalent phase retardation $\delta_e$, an equivalent fast axis azimuth $\theta_e$ and an equivalent optical rotation angle $\rho_e$ of the composite waveplate by the formulas (3)-(6);

3.5) calculating a polarization characteristic transfer matrix D of the basic polarization modulation unit based on the composite waveplate rotating compensator: according to the system parameters of the basic polarization modulation unit, including the equivalent phase retardation be, the equivalent fast axis azimuth $\theta_e$ and the equivalent optical rotation angle $\rho_e$ of the composite waveplate as well as the transmission axis azimuth P of the polarizer, calculating the polarization characteristic transfer matrix $D(\lambda)$ of the basic polarization modulation unit that varies with the wavelength $\lambda$ by the formulas (8)-(13). In the present invention, in order to ensure the stability of the solution of the polarization measurement system based on the composite waveplate rotating compensator, the number of times K of light intensity signal acquisition of the spectrometer in one optical period is taken as 50;

3.6) calculate the maximum singularity $$\zeta_{max} = \max_{\lambda \in \Gamma} \{\tau(\lambda)\zeta[D(\lambda)]\}$$

of the polarization characteristic transfer matrix $D(\lambda)$ of the basic polarization modulation unit in the wavelength range $\Gamma$ selected in the step ($\lambda$), wherein $\zeta$ represents the evaluation criterion of the singularity of the polarization characteristic transfer matrix, $\tau(\lambda)$ represents a coefficient related to the wavelength 2, and when the condition number is used as the evaluation criterion of the singularity of the polarization characteristic transfer matrix, $\zeta = \kappa_p$. In the present embodiment, the condition number of the polarization characteristic transfer matrix is calculated by selecting the 2-norm, that is, p=2, and specifically, the condition number is calculated by the formula (14). Let $\tau(\lambda)=1$, the maximum 2-norm condition number $K_{2max}$ of the polarization characteristic transfer matrix D of the basic polarization modulation unit in the wavelength range $\Gamma$ can be calculated;

3.7) reapeating the steps 3.3)-3.6), that is, reselecting different thicknesses [$d_1'$, $d_2'$, $d3'$, $d_4'$] and fast axis intersection angles [$\Delta\theta_1'$, $\Delta\theta_2'$, $\Delta\theta_3'$, $\Delta\theta_4'$] of the respective single-waveplates of the composite waveplate in the the thickness variation range $\Omega$ and the variation range $\Theta$ of fast axis intersection angles selected in the step (2), and continuing the calculation, until the thicknesses and the fast axis intersection angles of the respective single-waveplates of the composite waveplate respectively traverse the thickness variation range $\Omega$ and the variation range $\Theta$ of the fast axis intersection angle, at which time thicknesses and fast axis intersection angles of the respective single-waveplates of the composite waveplate that minimize the maximum condition number of the polarization characteristic transfer matrix $D(\lambda)$ of the basic polarization modulation unit in the wavelength range $\Gamma$ are final optimal parameters of the overall structure of the composite waveplate. In the present embodiment, the final optimizated results of parameters of the overall structure of the composite waveplate including four single-waveplates of magnesium fluoride are as follows: the respective single-waveplates have thicknesses of [33.58 μm, 13.24 μm, 13.49 μm, 20.21 μm] and fast axis intersection angles of [0, 67.9°, 46.4°, 14.9° ]. Spectral curves of the equivalent phase retardation, the equivalent fast axis azimuth and the equivalent optical rotation angle of the composite waveplate are shown in FIGS. 3(a)-(c). A curve of the 2-norm condition number of the polarization characteristic transfer matrix of the basic polarization modulation unit based on the composite waveplate rotating compensator is shown in FIG. 4.

3.8) manufacturing the required waveplates according to the structural parameters determined above, and determining whether the single-waveplate of the composite waveplate is a compound zero-order waveplate or a true zero-order waveplate according to the actual processing difficulty, cost, error tolerance range and other factors. Specifically, in the embodiment of present invention, all of the single-waveplates of magnesium fluoride are in the form of true zero-order waveplate;

(4) according to the specific configuration of the polarization measurement system, selecting a light source, a sample stage, a rotating assembly, a controller, a computer and the like, designing corresponding mechanical support components and a control system, and then constructing a polarization measurement system based on the composite waveplate rotating compensator.

Figure 5:
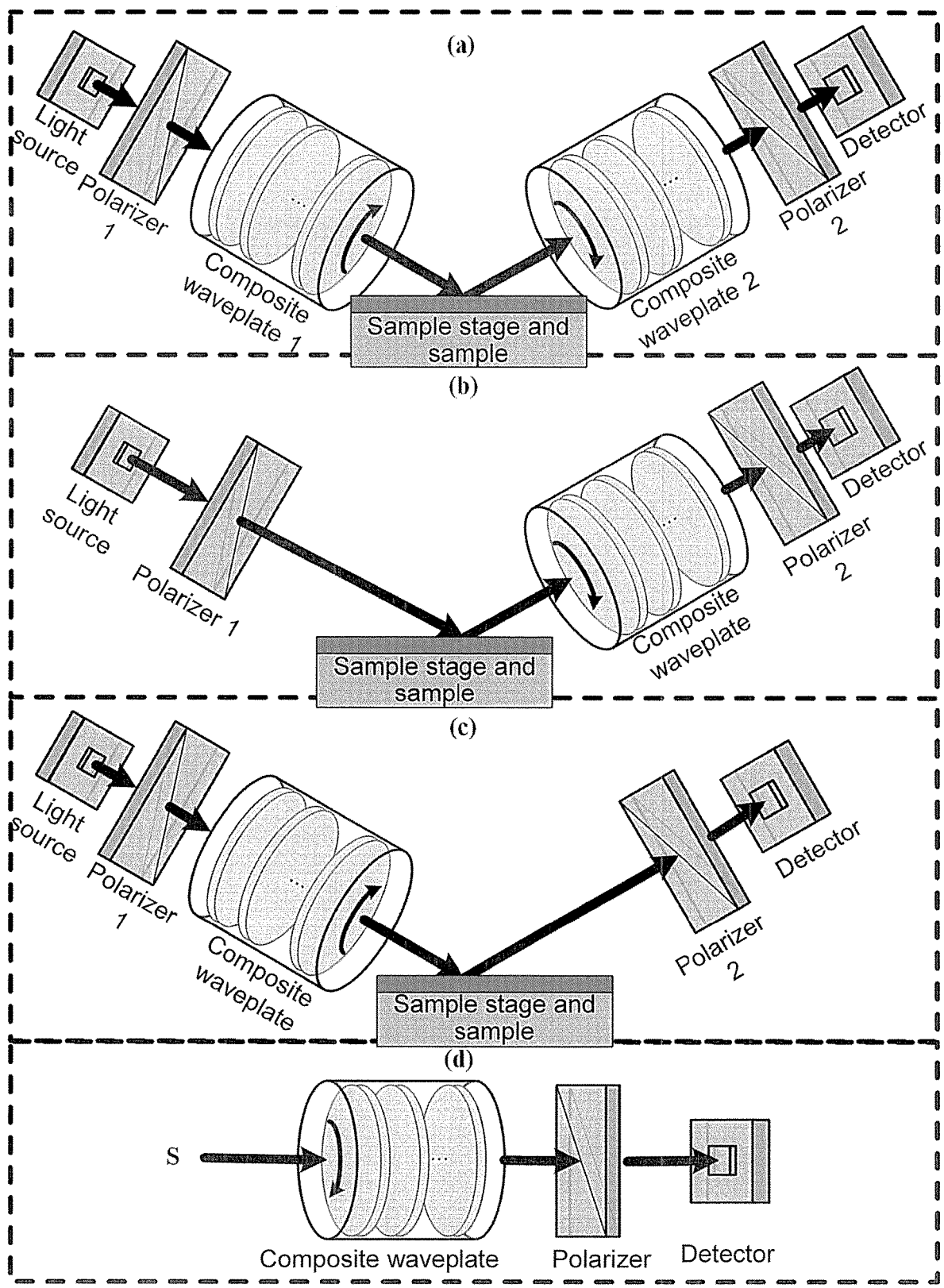
FIG. 5 shows schematic structural diagrams of various typical polarization measurement systems based on the invented polarization modulator.

FIG. 5 shows several typical polarization measurement systems based on the composite waveplate rotating compensator, including a Mueller matrix ellipsometer based on dual rotating composite waveplates ((a) of FIG. 5), a first configuration for conventional spectroscopic ellipsometer based on single rotating composite waveplate ((b) of FIG. 5), a second configuration for conventional spectroscopic ellipsometer based on single rotating composite waveplate ((c) of FIG. 5), a Stokes polarimeter based on rotating composite waveplate ((d) of FIG. 5) and the like. However, the polarization measurement system based on the composite waveplate rotating compensator is a type of system, and is not limited to the above specific configurations. Any polarization measurement system including the basic polarization modulation unit composed of the composite waveplate rotating compensator and the polarizer according to the present invention fall within the scope of the present invention.

In the design process of the polarization measurement system based on the composite waveplate rotating compensator in the above embodiment, the design process of the polarization measurement system based on the composite waveplate rotating compensator including four magnesium fluoride single-waveplates and with an applicable wavelength range of 200-1700 nm is only taken as an example to describe the design and implementation steps of the polarization measurement system based on the composite waveplate rotating compensator of the present invention. However, the present invention is not limited to the above specific embodiment, and according the design method disclosed by the present invention, those skilled in the art may adopt other modes of carrying out the invention, such as selecting different wavelength ranges, selecting different waveplate manufacture materials and different numbers of single-waveplates, adopting other evaluation criterions of the singularity of the polarization characteristic transfer matrix and the like. Therefore, any modification, equivalent substitution and improvements made without departing from the spirit and scope of the present invention should be included within the scope of the protection of the present invention.

What is claimed is:
1. A polarization modulator, comprising: a rotating compensator and a polarizer, wherein the rotating compensator is a continuously rotating composite waveplate, and the composite waveplate is composed of a plurality of single-waveplates of the same material,
wherein thicknesses and fast axis intersection angles of the respective single-waveplates comply with an optimization of a polarization characteristic transfer matrix of the polarization modulator,
wherein the optimization of the polarization characteristic transfer matrix of the polarization modulator satisfies conditions of having a smallest singularity of the polarization characteristic transfer matrix of the polarization modulator in an applicable wavelength range of the polarization modulator, comprising
- a minimum of a maximum singularity of the polarization characteristic transfer matrix in the applicable wavelength range,
- a minimum of an average singularity of the polarization characteristic transfer matrix in the applicable wavelength range, or
- a minimum of a mean square deviation of a singularity of the polarization characteristic transfer matrix in the applicable wavelength range.

2. The polarization modulator of claim 1, wherein the maximum singularity $\zeta_{max}$ of the polarization characteristic transfer matrix $D(\lambda)$ of the polarization modulator in the applicable wavelength range $\Gamma$ complies with a following formula:

$$\zeta_{max} = \max_{\lambda \in \Gamma} \{\tau(\lambda)\zeta[D(\lambda)]\}$$

in chosen thicknesses $[d_1, d_2, \ldots, d_N]$ and chosen fast axis intersection angles $[\Delta\theta_1, \Delta\theta_2, \ldots, \Delta\theta_N]$ of N single-waveplates
in a chosen manufacture material of the composite waveplate and a number N of the single-waveplates; and a chosen thickness variation range $\Omega$ and a chosen variation range $\Theta$ of fast axis intersection angles of the respective single-waveplates of the composite waveplate,
where $\tau(\lambda)$ represents a coefficient related to a wavelength $\lambda$; and $\zeta$
represents an evaluation criterion of the singularity of the polarization characteristic transfer matrix;
wherein the thicknesses and the fast axis intersection angles of the single-waveplates of the composite waveplate are corresponding to the minimum of the maximum singularity $\zeta_{max}$ of the polarization characteristic transfer matrix in the applicable wavelength range $\Gamma$.

3. The polarization modulator of claim 2, wherein the polarization characteristic transfer matrix $D(\lambda)$ complies with a following formula:

$D(\lambda)=f\{[\delta_1(\lambda),\delta_2(\lambda),\ldots,\delta_N(\lambda)];[\theta_1(\lambda),\theta_2(\lambda),\ldots,\theta_N(\lambda)];P\}$ wherein f represents a functional relationship determined by the polarization transfer characteristic of the polarization modulator, P represents a transmission axis azimuth of the polarizer, $\delta_1(\lambda), \delta_2(\lambda), \ldots, \delta_N(\lambda)$ respectively represent phase retardations of the 1st, 2nd, . . . , N-th single-waveplates, and $\theta_1(\lambda), \theta_2(\lambda), \ldots, \theta_N(\lambda)$ respectively represents fast axis azimuths of the 1st, 2nd, . . . , n-th, . . . , N-th single-waveplates.

4. The polarization modulator of claim 3, wherein the phase retardation of the respective single-waveplate complies with a following formula:

$$\delta_n(\lambda) = \frac{2\pi \cdot d_n \cdot \Delta n(\lambda)}{\lambda}$$

wherein $\theta_n(\lambda)$ represents the phase retardation of the n-th single-waveplate, $d_n$ represents the thickness of the n-th single-waveplate, $\lambda$ represents the operating wavelength of the composite waveplate, $\lambda \in \Gamma$, and $\Delta n(\lambda)$ represents the birefringence of the manufacture material of the waveplate at the wavelength $\lambda$.

5. The polarization modulator of claim 3, wherein the fast axis azimuth of the respective single-waveplate complies with a following formula:

$\theta_n(\lambda)=\theta_{N0}+\Delta\theta_n$ wherein $\theta_n(\lambda)$ represents the fast axis azimuth of the n-th single-waveplate, $\Delta\theta_n$ represents an intersection angle between the fast axis of the n-th single-waveplate and the fast axis of the reference single-waveplate, and $\theta_{N0}$ represents a fast axis azimuth of a reference single-waveplate.

6. A polarization measurement system according to claim 1, wherein the polarization measurement system comprising at least one polarization modulator of claim 1.

7. The polarization measurement system of claim 6, wherein polarization characteristics of devices and polarized lights of the polarization measurement system are represented by a Mueller matrix or a Stokes vector.

8. The polarization measurement system of claim 6, wherein the polarization measurement system is an ellipsometer based on a single rotating compensator, an ellipsometer based on dual rotating compensators or a Stokes polarimeter based on rotating compensator.

* * * * *